United States Patent [19]

Lewis, Jr.

[11] 4,279,542
[45] Jul. 21, 1981

[54] SUBSEA WELL FLOW LINES TIE-IN USING CONDUCTORS

[75] Inventor: Harry R. Lewis, Jr., Aberdeen, Scotland

[73] Assignee: Standard Oil Company (Indiana), Chicago, Ill.

[21] Appl. No.: 103,886

[22] Filed: Dec. 17, 1979

[51] Int. Cl.³ .................. E21B 43/01; F16L 1/04
[52] U.S. Cl. .................................. 405/169; 166/347
[58] Field of Search ............ 405/158, 169, 173, 195; 166/339, 341, 345, 347, 349, 367

[56] References Cited

U.S. PATENT DOCUMENTS

| | | | |
|---|---|---|---|
| 3,373,807 | 3/1968 | Fischer et al. | 405/169 X |
| 3,378,066 | 4/1968 | Otteman et al. | 166/347 X |
| 3,696,864 | 10/1972 | Brown | 405/169 |
| 3,701,261 | 10/1972 | Nolan | 405/169 |

Primary Examiner—David H. Corbin
Attorney, Agent, or Firm—John D. Gassett

[57] ABSTRACT

This concerns a method of connecting a subsea flowline to facilities on top of an offshore platform which is supported above a body of water and which has a plurality of conductors extending from above the water to within the sea bottom. One of the conductors is cut just above the mud line and raised to leave a gap between the lower end of the upper portion of the conductor and the conductor stub which remains firmly anchored in the sea bottom. The flowline is pulled to a position just adjacent said conductor stub. A production riser is lowered through the upper portion of the conductor and then the lower end of the production riser is connected to the pulled end of the flowline.

4 Claims, 10 Drawing Figures

SUBSEA WELL FLOW LINES TIE-IN USING CONDUCTORS

BRIEF SUMMARY OF THE INVENTION

This invention relates to a method and system of connecting a subsea well flowline to an offshore platform. Typically, an offshore platform can be a platform deck supported above the surface of the body of water by a plurality of long columns called piles which may be driven through the jacket legs, which act as a template, into the floor of the ocean to give it stability. Typically, the platform supports a plurality of large conductors, e.g., 24" to 36", which extend from the platform deck to within the sea floor. It is through these driven conductors that subsea wells are normally drilled. Frequently there will be a spare conductor, i.e., a driven conductor pipe that is not used for drilling wells.

I use this spare driven conductor as a means of forming a connection between the top of the platform and a flowline along the sea floor. The driven conductor is cut just above the sea floor and the upper portion of the conductor is lifted a short distance above the conductor stub left in a sea floor, for example, enough to form at least about a 10-foot gap. A flowline alignment template is then attached by divers to the stub of the driven conductor which typically extends about 3 feet above the sea floor and a flowline hauling cable and sheave means is lowered and connected to the stub for pulling a flowline into the flow alignment template. Special connector means are provided to connect the flowline, which has been pulled to the flow alignment template, to a flow line riser which extends inside the raised portion of the driven conductor. By using this method, I have thus saved or eliminated the need to consider the use of a conventional J-tube on the platform or adding an additional prefabricated riser to the platform jacket leg which would require an expensive construction barge and might result in adverse structural characteristics of the platform.

A better understanding of the invention can be had from the following description taken in conjunction with the drawings.

DRAWINGS

DETAILED DESCRIPTION OF THE INVENTION

Figure 1:
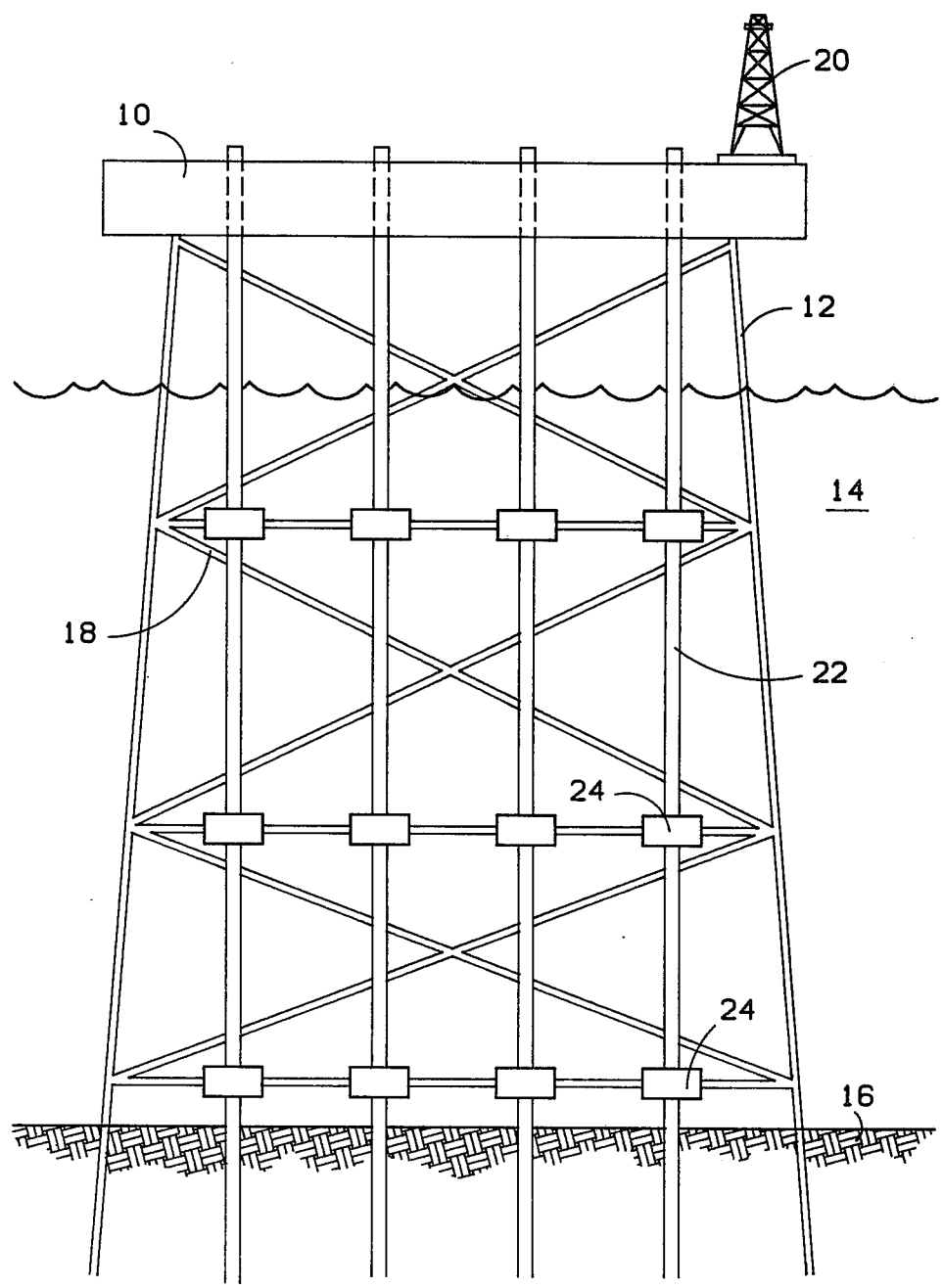
FIG. 1 illustrates an offshore platform having a plurality of driven conductors.

Shown in FIG. 1 is a platform 10 supported above the surface of a body of water 14 by plurality of legs 12. Legs 12 may be large diameter pipe through which steel pipes are driven into the sea bottom 16 a sufficient distance to give adequate support. Cross-bracing 18 is provided. A derrick and drilling system 20 is provided upon platform 10 and is used to drill wellbores through driven conductors 22 which may be 30-inch diameter pipe which are guided through conductor guides 24 and extend into the sea bottom 16. Derrick 20 is movable from one conductor 22 to another in a known manner for conducting drilling operations. The platform and derrick illustrated in FIG. 1 are conventional type platforms and their use is well-known in the offshore drilling and production industry.

Figure 2:
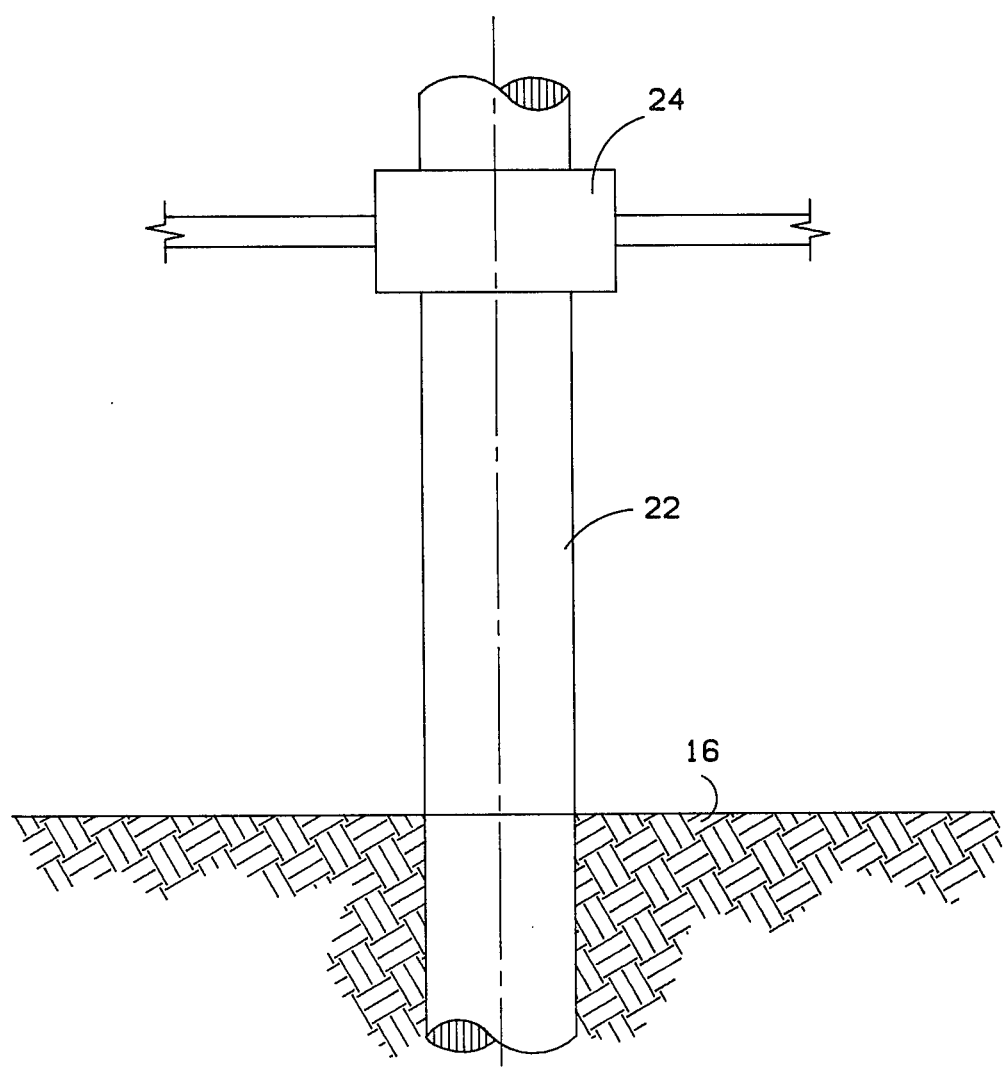
FIG. 2 shows an enlarged view of the lower end of the driven conductor.
Figure 3:
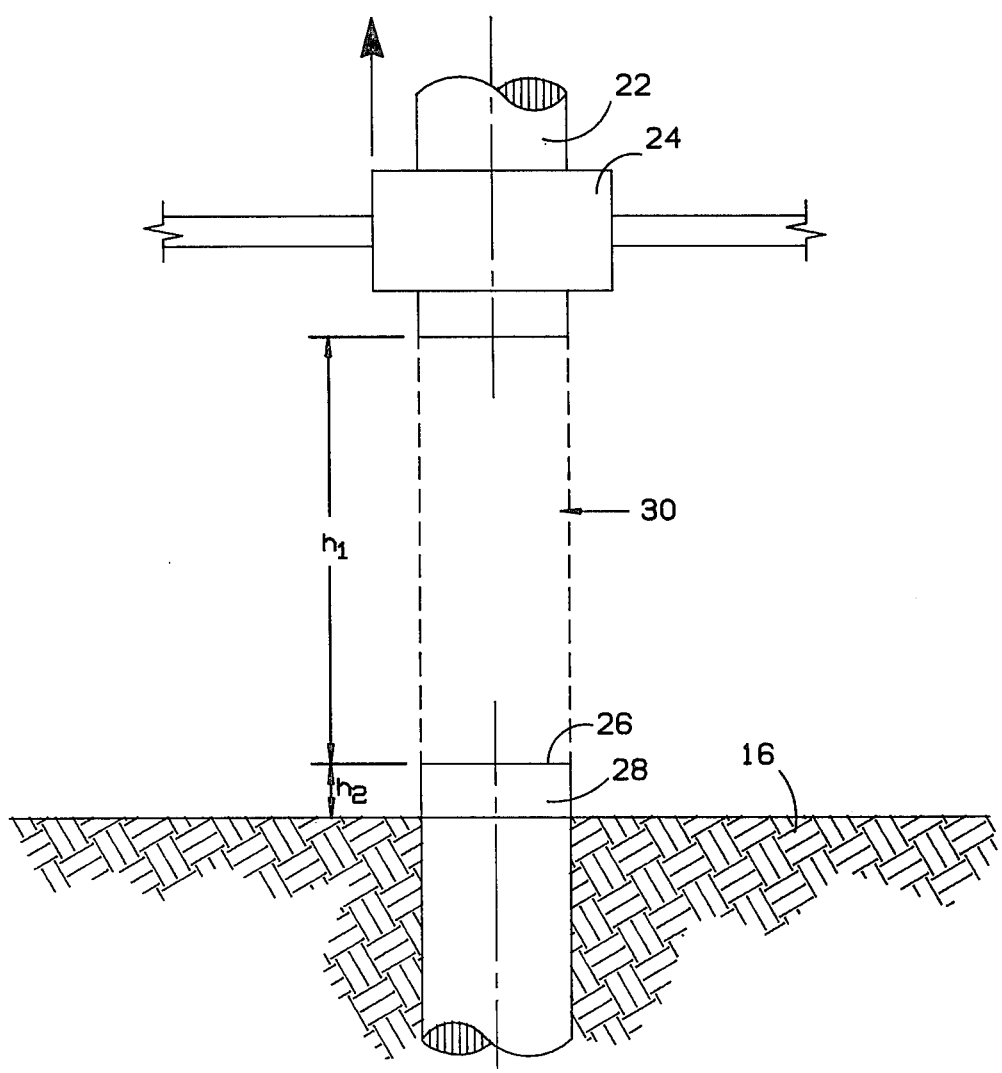
FIG. 3 is similar to FIG. 2 except the conductor has been cut and the upper part raised to form a gap at the lower end thereof.

Attention is next directed to FIG. 2 which shows an enlarged view of conductor guide 24 and driven conductor 22. The conductor shown in FIG. 2 can be considered a "spare well slot" or spare conductor which is not needed for drilling wells inasmuch as in many cases there are a sufficient number of other conductors for that purpose. In FIG. 3, conductor 22 has been cut at level 26 leaving a stub 28 sticking slightly above the sea floor 16. The height of stub 28 is indicated as $h_2$ and may be a matter of 2 to 5 feet. The conductor is shown as having been raised a height $h_1$ which may be 10 feet, leaving a gap 30.

Figure 4:
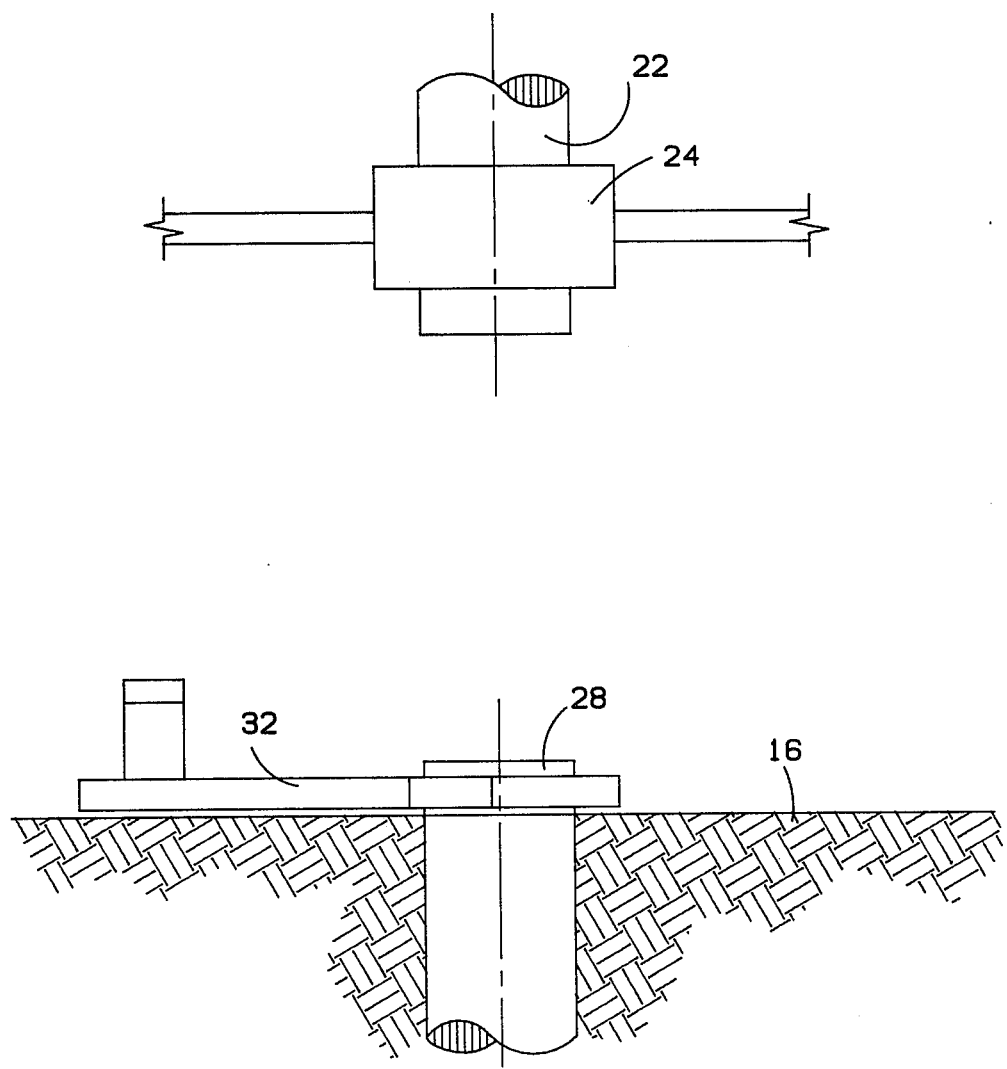
FIG. 4 is similar to FIG. 3 except a flowline alignment template has been provided over the stub of the driven conductor.

FIG. 4 is similar to FIG. 3 except a flowline alignment template 32 has been provided adjacent the sea floor 16 and is anchored in position on stub 28.

Figure 5:
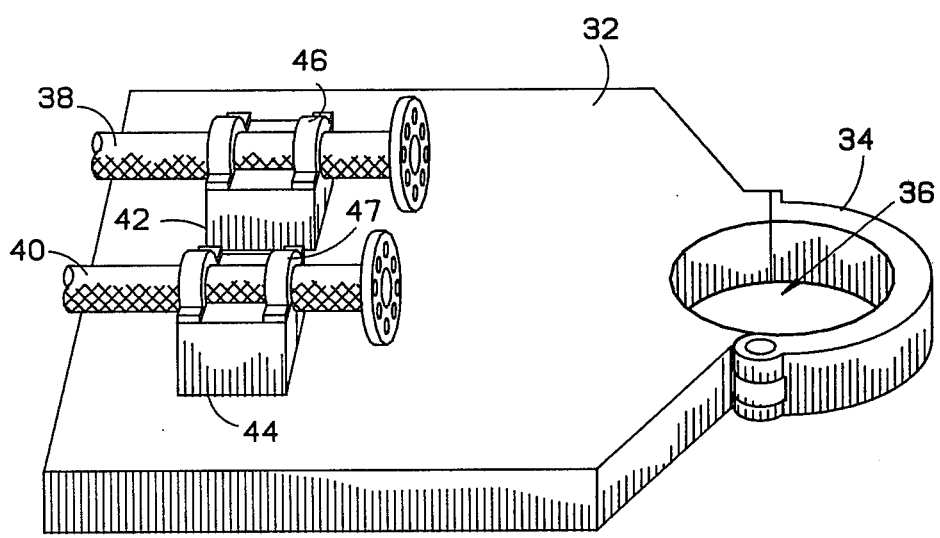
FIG. 5 illustrates a typical flowline alignment template.

Attention is next directed to FIG. 5 which illustrates a flowline alignment template 32. It has a ring clamp 34 which forms a circular opening 36 which fits around stub 28. Ring 34 is bolted and hinged to the main body of the alignment template and is an integral part thereof. Flowlines 38 and 40, when pulled in as described later, can be secured in guide blocks 42 and 44, respectively, and then clamped by clamping means 46 and 47. The flowllline alignment template 32 can be lowered over the side of the platform and clamped to the conductor stub 28 at the sea floor using a diver.

Figure 6:
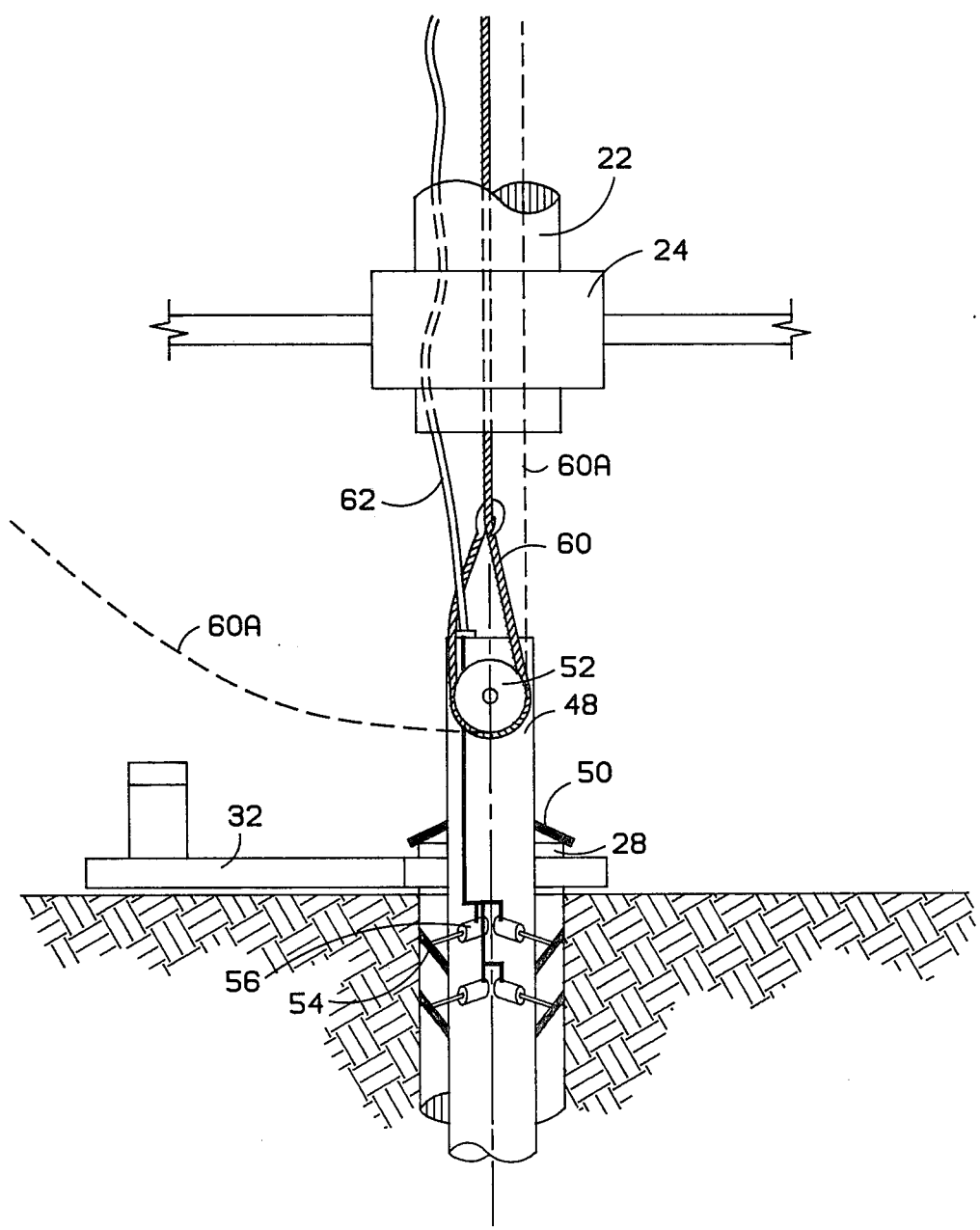
FIG. 6 illustrates a sheave block lowered on cable and hydraulically locked into the conductor stub.

After I have secured the flowline alignment template to the stub, I then lower a sheave block assembly 48 as illustrated in FIG. 6. Diver-actuated dogs 50 engage the upper end of stub 28 to assure that the upper end of sheave block assembly 48 having sheave 52 is at the proper level. Slips 54 are provided and are actuatable by hydraulic cylinder 56 to prevent upward movement of sheave block assembly 48. A cable 60 is used to lower and raise the sheave assembly and to pull in the flowlines, and a hydraulic hose means 62 is connected to and controls hydraulic ram 56 used for engaging and disengaging slips 54. When sheave assembly 48 is landed and hydraulic slips 54 are engaged, cable 60 is unhooked from itself and pulled out by divers (as indicated by dashed line 60A) to connect with either the end of the flowline on the seabed or with another cable attached to the lay barge which pulls in cable 60 to attach to the flowline on board.

Figure 7:
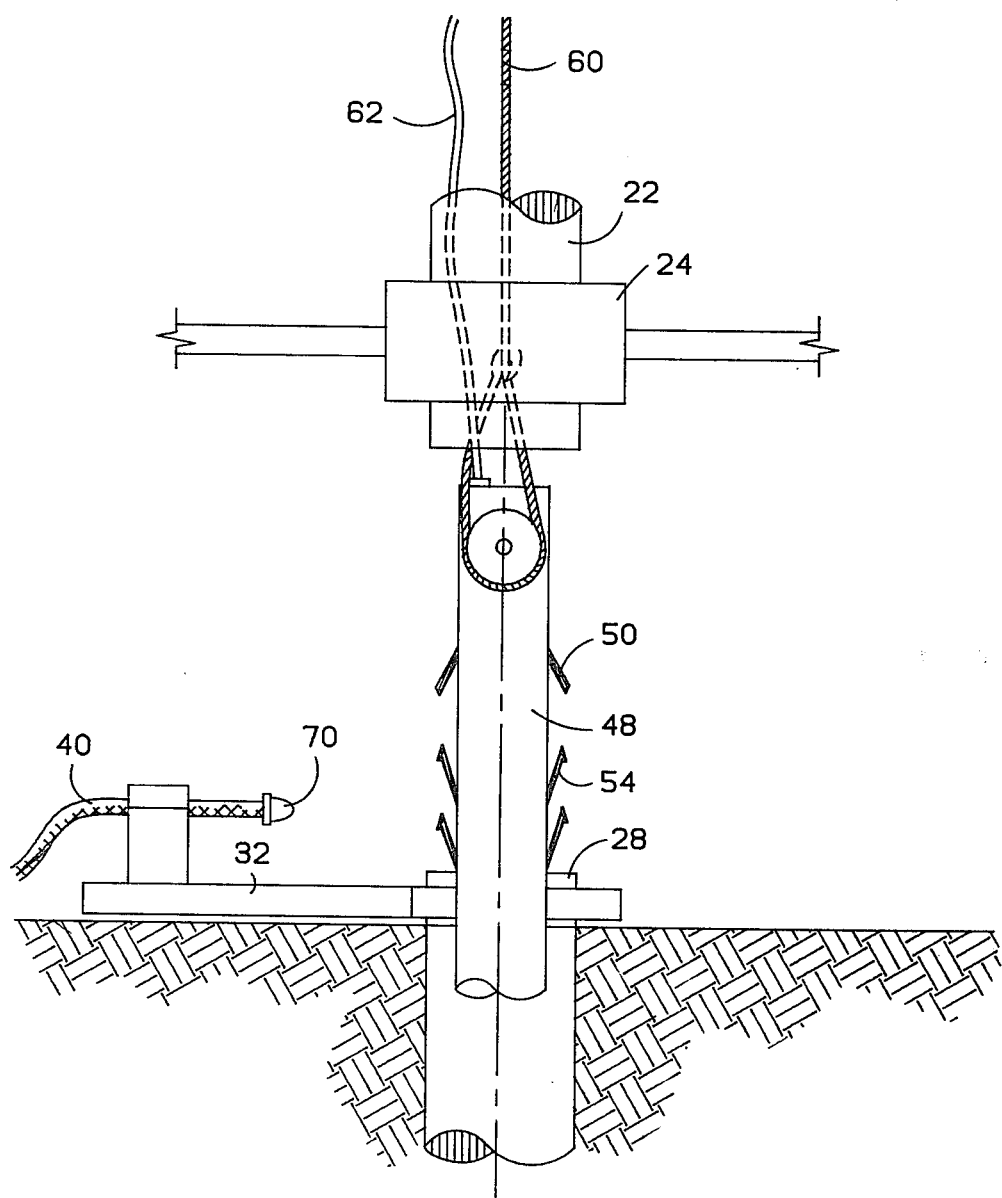
FIG. 7 illustrates a flowline pulled into said flowline alignment template.

The flowline haul-in cable is then reeled in by means (not shown) on platform 10 until the flowline to which cable 60 is connected is in the vicinity of the alignment template 32. During this phase, cable 60 is in the position indicated by dashed line 60A. As shown in FIG. 7, the flowline 40 is within template 32 with pull-in eye 70 still attached thereto, but cable 60 disconnected. When flowline 40 is pulled in and secured to the flow line alignment template 32, the cable end is removed from the pull-in eye and hooked back to itself, the latching dogs 54 and 50 are then released so that sheave block assembly 48 can be lifted to the surface through conductor by cable 60. The sheave block assembly is then pulled all the way to the surface.

Figure 8:
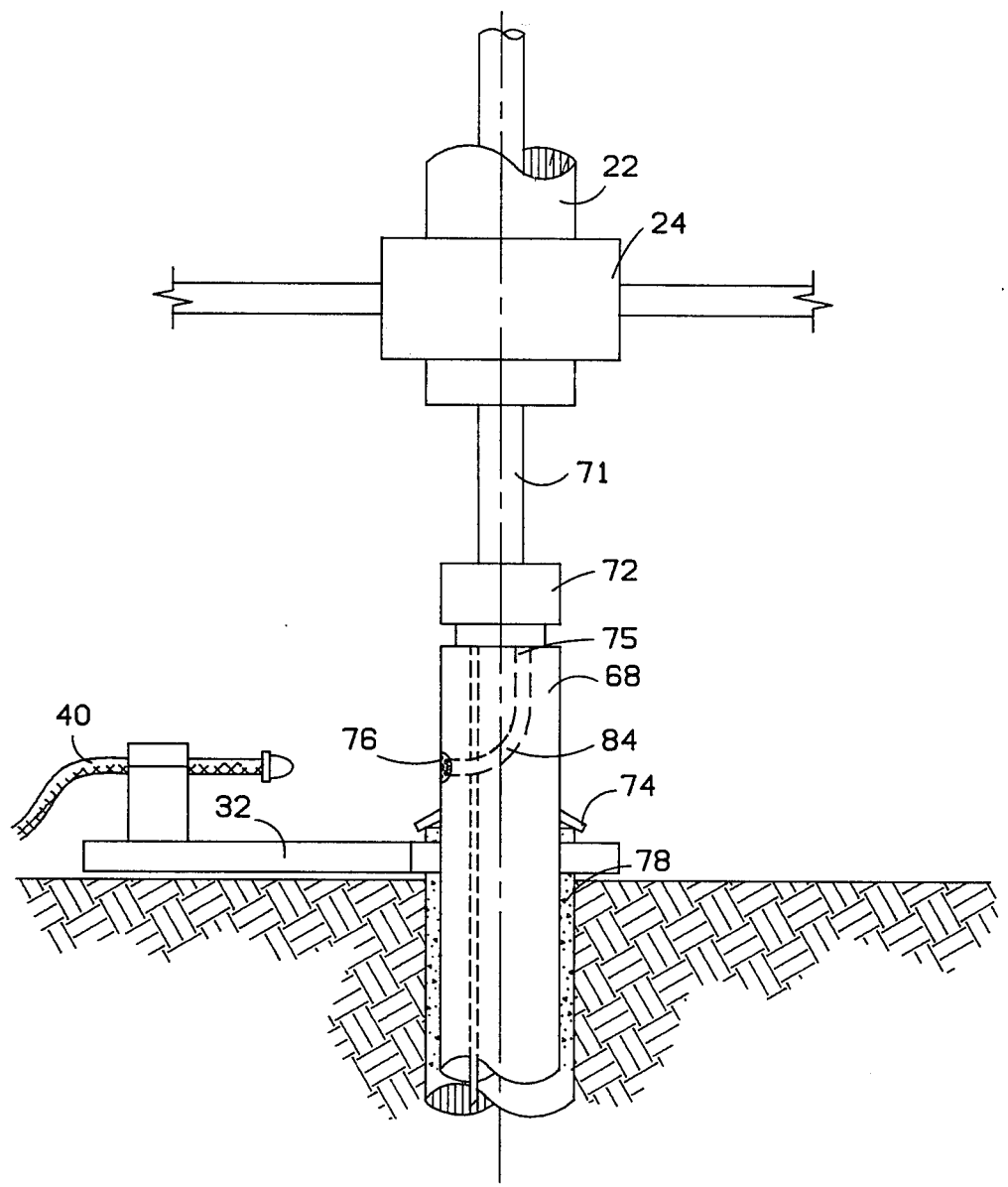
FIG. 8 illustrates an elbow assembly lowered and cemented into place within a conductor stub.

Attention is next directed to FIG. 8 which illustrates a flowline elbow assembly 68 which has been lowered by a drill pipe 71 which has a hydraulic connector 72 which is attached to the elbow assembly which has been provided with diver actuated dogs 74 to assure the proper height of flange 76. When elbow 68 is properly positioned, it is cemented in a conventional manner. Once this is done, drill pipe 71 and hydraulic connector 72 are disconnected from assembly 68 and raised to the surface where they are placed on the deck 10. Elbow assembly 69 is provided with an "ell" shaped passage 84 for each flowline 68. Passage 84 has a lateral flange facing 76, which is flush with the elbow assembly, and an upper connecting means 75.

Figure 9:
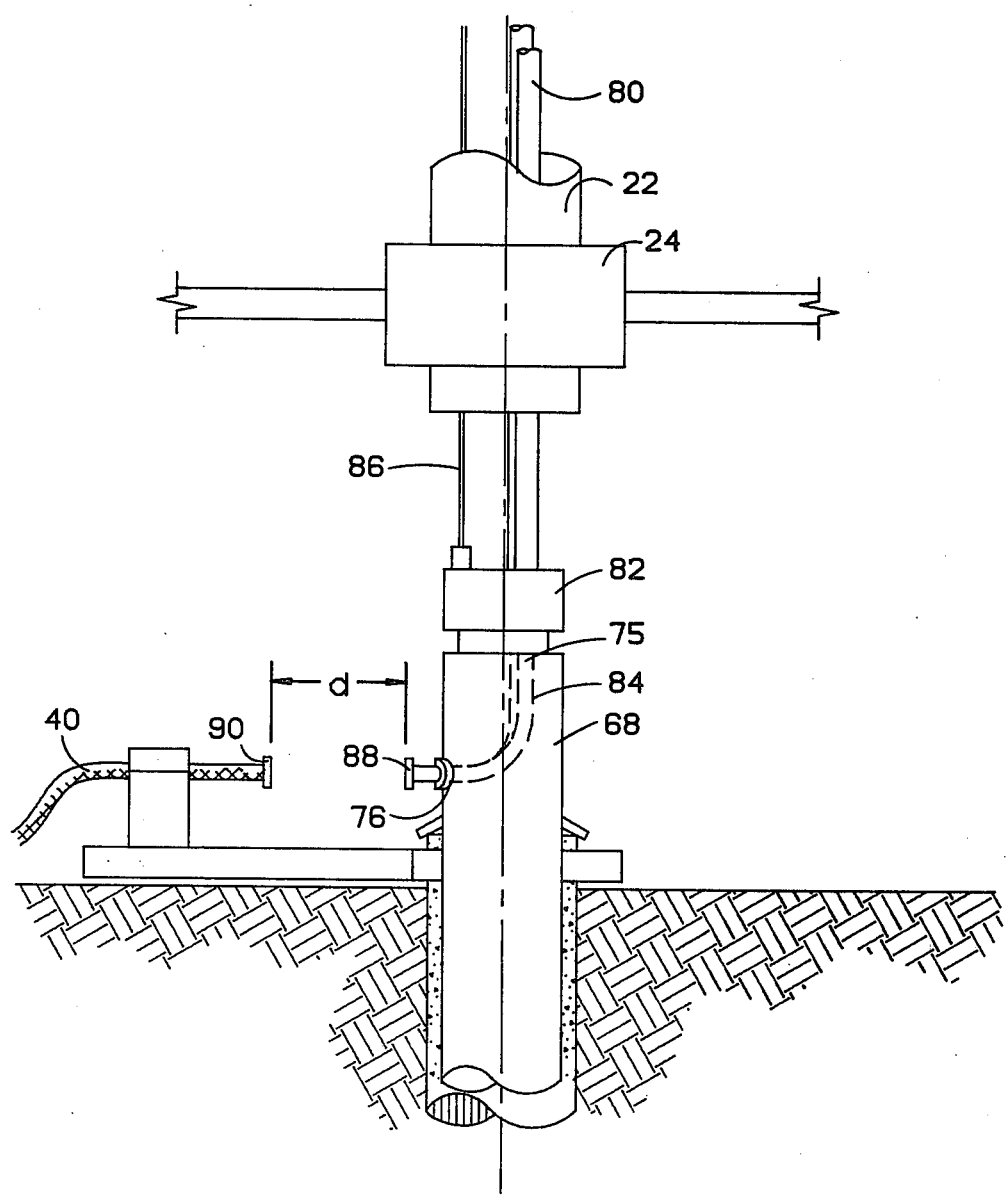
FIG. 9 is similar to FIG. 8 but shows additionally a flowline riser.

Attention is next directed to FIG. 9 which illustrates a plurality of flowline risers 80 which may be 4 inches in diameter which are connected to a hydraulic collet connector 82 which is connected to the upper end of flowline elbow assembly 68. As is well known, the lower end of each riser 80 is connected to the upper end of its respective elbow passage 84. There will be the same number of elbows passage 84 as there are riser pipe flowlines 80 which will also correspond to the number of flowlines 40 and 38 as illustrated in FIG. 5. The collet is operated through hydraulic hose 86. The lower end of each riser pipe 80 is connected to its respective means 75 of elbow passage 84. Means to connect a plurality of riser pipes (such as 80) to a plurality of connecting means 75 are well known. A companion flange 88 is provided for outlet flange 76 of elbow assembly 68. A diver next measures the distance between flange 90 on flowline 40 and companion flange 88 in order that a spool fitting can be fabricated to fit the gap (shown as distance d).

Figure 10:
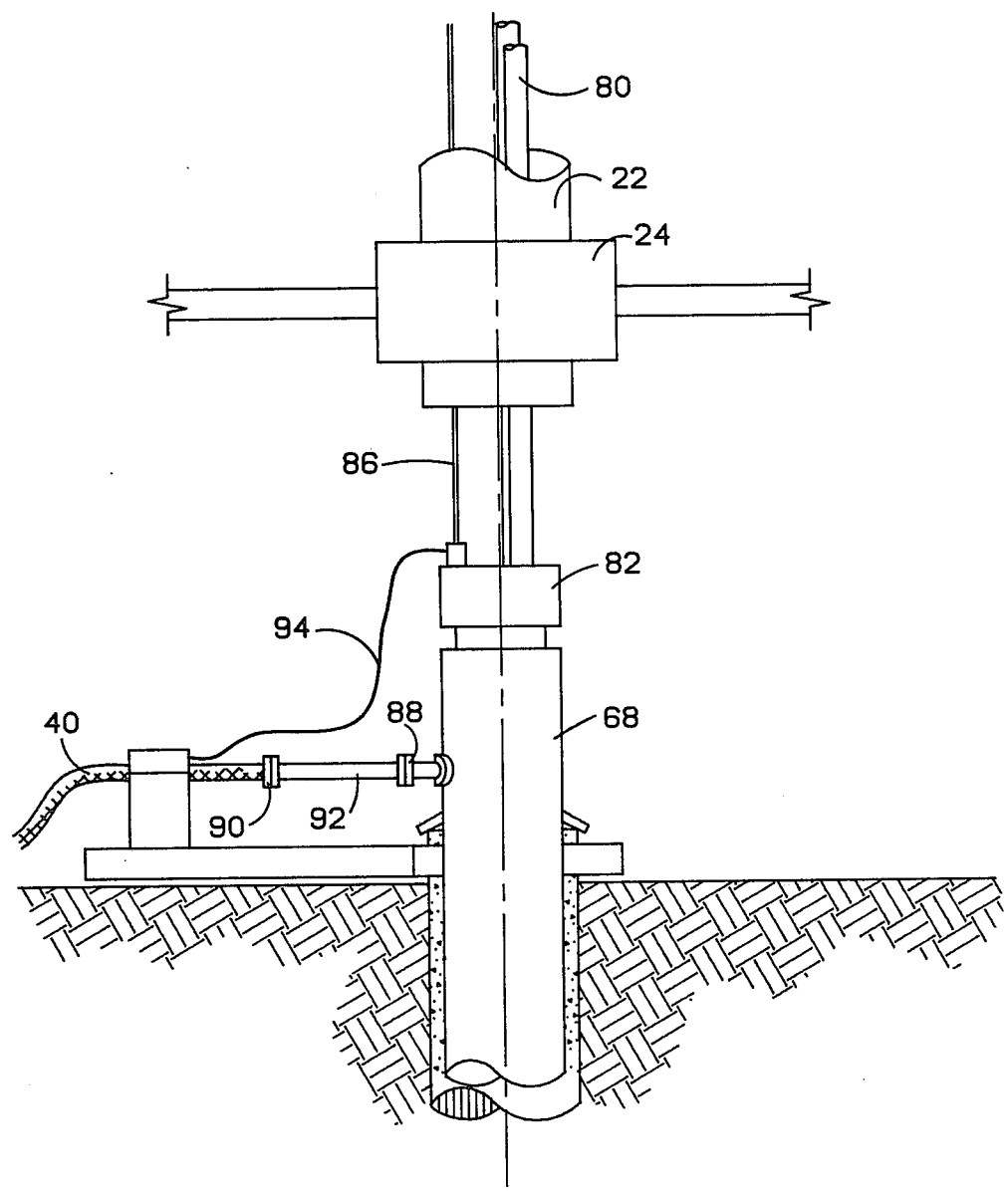
FIG. 10 illustrates the completed flowline riser assembly.

Attention is next directed to FIG. 10 which shows a spool piece 92 placed between flange 90 and companion flange 88. Thus flowline 40 is effectively connected through spool 92, elbow assembly 69, and riser pipe 80 to the top of deck 10. A hydraulic flowline bundle 94 can be a part of the flowline bundle 86 and can be used to control valves (e.g., on remote subsea oil well) or other things necessary for operating flowline 40. The conductor pipe 22 can be cut off at the surface to whatever height is necessary and welded in place. The flow from flowline 40 and any other flowlines that are connected to the system is now ready for production.

There are many benefits to be obtained by using my invention. For example, work can be performed without the use of major construction vessels. When the flowline is being pulled, the pulling loads are transmitted to the sea bed, not the platform. The production risers are protected through the splash zone by the conductors and damaged or corroded risers can easily be replaced. Also, the riser surfaces in the same area as the wellheads, thus vastly simplifying connection to the production manifolding and the emergency shutdown and fireloop systems.

While the above invention has been described in detail, various modifications can be made thereto without departing from the spirit or scope of the invention.

What I claim is:

1. A method of connecting a subsea flowline to facilities on an offshore platform supported above a body of water by piles extending into the sea bottom, said platform having a plurality of conductors through which wells may be drilled from the platform and extend from the sea floor to above the surface of said water which comprises:
    cutting said conductor in two near the sea bottom so as to have an upper portion and a conductor stub,
    raising said upper portion of said conductor to form a gap between the upper portion and the conductor stub,
    pulling said flowline to the vicinity of said conductor stub,
    running a production riser through said upper portion of said conductor, and
    connecting said flowline to the lower end of said production riser.

2. A method as defined in claim 1 in which the step of connecting said flowline to the lower end of said production riser includes anchoring a flowline elbow assembly in said conductor stub, said flowline elbow assembly having at least one passage therethrough with one end opening to the vertical and the other laterally in the direction of said flowline, and
    connecting the lateral opening of said flowline elbow assembly to said flowline and the vertical opening to said lower end of said production riser.

3. A method as defined in claim 1 in which the step of pulling the flowline includes:
    lowering a sheave block assembly into said conductor stub, said sheave block assembly having a sheave, upper sheave height control dogs and lower anchoring dogs;
    lowering said sheave block assembly into said conductor stub until the movement is stopped by said upper sheave height dogs and
    then actuating said lower anchoring dogs.

4. A method as defined in claim 2 in which said step of pulling said flowline includes fixing a flowline alignment template to said conductor stub, said template having guides for said flowline so that when said flowline is pulled through said guides, the pulled end of the flowline is properly aligned.

* * * * *